United States Patent [19]

Erikson et al.

[11] 4,123,422
[45] Oct. 31, 1978

[54] AMIDE MODIFIED SATURATED POLYESTER POLYOLS AND METHOD OF MAKING

[75] Inventors: J. Alden Erikson, Gibsonia; William J. Birkmeyer, Oakmont, both of Pa.

[73] Assignee: PPG Industries, Inc., Pittsburgh, Pa.

[21] Appl. No.: 855,041

[22] Filed: Nov. 25, 1977

[51] Int. Cl.$^2$ .................... C08G 63/68; C08G 63/76
[52] U.S. Cl. .................................. 528/273; 260/858; 528/288; 528/291; 560/19; 560/41; 560/125; 560/171
[58] Field of Search ................ 260/75 N, 75 NM, 858

[56] References Cited

U.S. PATENT DOCUMENTS

| | | |
|---|---|---|
| 2,969,335 | 1/1961 | Simons ............................... 260/22 R |
| 3,494,847 | 2/1970 | Yurcheshen et al. .......... 260/29.6 H |
| 3,793,250 | 2/1974 | Schmidt et al. .................... 260/75 N |
| 3,849,383 | 11/1974 | Fetscher et al. ................... 260/75 N |
| 3,917,570 | 11/1975 | Chang et al. ..................... 260/75 TN |
| 3,922,252 | 11/1975 | Holub et al. ....................... 260/75 N |
| 4,066,593 | 1/1978 | Czajka et al. ..................... 260/75 N |

*Primary Examiner*—Lucille M. Phynes
*Attorney, Agent, or Firm*—Charles R. Wilson

[57] ABSTRACT

Amide modified saturated polyester polyols having an acid number of from about 0 to about 27, a hydroxyl number of from about 12 to about 360 and an amine number of from about 0.1 to about 6.5 are disclosed. The amide modified saturated polyester polyols are useful as part of a two-package urethane coating system.

20 Claims, No Drawings

AMIDE MODIFIED SATURATED POLYESTER POLYOLS AND METHOD OF MAKING

BACKGROUND OF THE INVENTION

The subject invention relates to amide modified saturated polyester polyols. More particularly, it relates to amide modified saturated polyester polyols of specified acid number, hydroxyl number and amine number and their process of production. The polyester polyols are especially useful in making two-package urethane coatings.

Saturated polyester polyols are a well-known class of materials. One field of use they have found has been in their reaction with isocyanates to produce urethane coatings. The urethane coatings are known for their excellent durability, chemical resistance, abrasion resistance, adhesion, toughness and flexibility. Coatings for wire, storage tanks, automobiles, etc., are among the many end-uses found for the urethane coatings because of the outstanding properties they impart to these products.

One-package urethane coatings (based on blocked isocyanates which react with —OH groups at elevated temperatures) and two-package urethane coatings (based on the mixing of an isocyanate and a polyol at the time of coating to form high polymers) are both extensively used. Each type of urethane coating offers advantages in terms of application convenience, coating properties, etc. Generally, the two-package urethane coatings are noted for their chemical resistance and flexibility. Of course, a wide range of coating properties are available depending on the nature of the individual components and amounts thereof used in the urethane producing reaction.

The saturated polyester polyols in particular have been modified in various ways to achieve different desired properties. For example, polyesters have been treated with imines so as to obtain modified polyesters. Such modified polyesters have been further reacted with isocyanates to produce a urethane coating satisfactory in many respects. U.S. Pat. No. 3,494,847 is an example of the use of imines to modify polyesters. However, doubts as to the industrial safety of certain imines has made their use somewhat restricted.

It has now been found that amide modified saturated polyester polyols can be made by a process which avoids the use of imines and which gives an amide modified polyester polyol possessing superior characteristics, especially with regard to dispersing pigments and stabilizing the dispersions obtained.

It is accordingly an object of this invention to produce amide modified saturated polyester polyols.

It is another object of this invention to produce amide modified saturated polyester polyols by a convenient and safe method.

These and other objects will become apparent from the description which follows.

As used herein all percentages and ratios are by weight unless otherwise indicated.

SUMMARY OF THE INVENTION

An amide modified saturated polyester polyol is made wherein the polyester polyol backbone is prepared from a polyhydric alcohol having from 2 to 15 carbon atoms and a polybasic carboxylic acid having from 4 to 14 carbon atoms, said polyester polyol backbone having an acid number of from about 3 to about 30 and a hydroxyl number of from about 10 to about 300, said polyester polyol backbone being modified with a primary or secondary amine of formula $N(H)(R)_a(C_yH_{2y}OH)_b$ where R is hydrogen or an alkyl group containing from 1 to 4 carbon atoms, $y$ is 2 or 3, $a$ is 0 or 1 and $b$ is 1 or 2 with the proviso that $a + b = 2$, said amide modified polyester polyol having an acid number of from about 0 to about 27, a hydroxyl number of from about 12 to about 360 and an amine number of from about 0.1 to about 6.5.

A process of making the above-described amide modified saturated polyester polyols is also disclosed.

DETAILED DESCRIPTION

The amide modified saturated polyester polyols useful herein are produced by reacting a polyhydric alcohol with a polybasic carboxylic acid to obtain a polyester polyol backbone which is thereafter reacted with a primary or secondary amine. Each of the reactants as well as the reaction conditions are discussed in the following paragraphs.

Polyhydric alcohols used in making the herein described polyester polyols have a functionality of at least 2 and contain from 2 to 15 carbon atoms, preferably from 2 to 8 carbon atoms. Such polyhydric alcohols include diols, triols, and higher polyols. Useful diols include the alkylene glycols, e.g., ethylene glycol, propylene glycol, butylene glycol, diethylene glycol, dipropylene glycol, triethylene glycol, neopentyl glycol, neopentyl glycol hydroxypivalate, 2,2,4-trimethyl-1,3-pentanediol, cyclohexanedimethanol and trimethylene glycol. Triols and higher polyols include trimethylolethane, trimethylolpropane, glycerol, 1,2,6-hexanetriol, pentaerythritol, sorbitol and manitol. While it is not necessary to have a triol or higher polyol present, the branching such polyols provide is desirable for some uses. An especially preferred polyhydric mixture is a mixture of a diol and a triol, each having from 2 to 15 carbon atoms, wherein at least 50 mole percent of the mixture is the diol. Neopentyl glycol and trimethylolpropane in a mole ratio of about 1.4:1 to about 1.5:1 are specific examples of the preferred alcohol mixture.

The polybasic carboxylic acid has a functionality of at least 2 and contains from 4 to 14 carbon atoms. It can be an aliphatic carboxylic acid, an alicyclic acid or an aromatic carboxylic acid, providing it has the required number of carbon atoms and proper degree of functionality. For purposes of the present invention the aromatic nuclei of aromatic carboxylic acids, e.g., phthalic acid, are regarded as saturated since the double bonds do not react by addition reaction. (This is as opposed to the addition reaction one obtains using an alpha-beta unsaturated acid, e.g., fumaric acid.) Therefore, wherever the term "saturated polyester polyol" is utilized, it is to be understood that this term includes compound containing aromatic unsaturation. Defining a saturated polyester polyol in this manner is in accord with the terminology used in the industry.

Examples of polybasic carboxylic acids useful herein include phthalic acid, phthalic anhydride, isophthalic acid, terephthalic acid, hexahydrophthalic anhydride, succinic acid, succinic anhydride, glutaric acid, adipic acid, azelaic acid, sebacic acid and mixtures thereof. The aliphatic carboxylic acids contain from 4 to 14 carbon atoms while the alicyclic or aromatic carboxylic acids contain from 8 to 14 carbon atoms (inclusive of the number of carbon atoms in the carboxyl groups). The dicarboxylic acids are the preferred polybasic carboxylic acid, though minor amounts of monobasic acids, e.g., benzoic acid, and higher carboxylic acids, e.g., trimellitic acid can be included with the dicarboxylic acid in order to obtain varying properties as desired. An especially preferred polybasic carboxylic component has been found to be a mixture of hexahydrophthalic anhydride and adipic acid in a mole ratio of from about 1:0.8 to about 1:0.9.

The polyester polyol backbone is produced using conventional batch or continuous process techniques with the reaction conditions and ratio of reactants chosen so as to provide a product having the desired residual carboxyl and hydroxyl groups, i.e., a polyester polyol. The acid and hydroxyl numbers set out below dictate the molar ratios of the individual reactants; given such numbers, one of ordinary skill in the art can back-calculate in known fashion to determine the starting levels of polyhydric alcohol and polybasic carboxylic acid.

In one process of making, the polyhydric alcohol and polybasic carboxylic acid are charged into a reaction vessel and reacted at from about 175° C. to about 250° C. to provide a partially reacted polyester polyol having the below defined acid and hydroxyl numbers. An inert organic, normally-liquid solvent having a boiling point below 150° C. can be used to azeotrope out the water of condensation conveniently, if desired. Included in this group of solvents are benzene, toluene, xylene, ethyl benzene, methyl cyclohexane, cyclohexane and petroleum hydrocarbon distillates having a distillation temperature below 150° C. The above solvents are used singly or in combination. They are used in an amount to provide satisfactory fluidity to the reaction mixture and give better reaction control.

A catalyst is not necessary since the esterification proceeds quite smoothly without the use of one. However, suitable catalysts such as butyl stannoic acid, dibutyltin dilaurate and dibutyltin oxide can be used to reduce reaction times.

The reaction is allowed to proceed until the polyester polyol backbone has an acid number of from about 3 to about 30, preferably from about 10 to about 16 and a hydroxyl number of from about 10 to about 300, preferably from about 130 to about 145 (all numbers are on a solids basis). At this point, the reaction is quenched by the addition of inert solvent and/or removal of heat. The reaction mixture can sit indefinitely prior to proceeding with the amide modification step or can be further reacted immediately as described in the next paragraph.

The polyester polyol backbone described above is next reacted with a primary or secondary amine to produce the desired amide modified saturated polyester polyol. The primary or secondary amine has the formula $N(H)(R)_a(C_yH_{2y}OH)_b$ where R is hydrogen or an alkyl group containing from 1 to 4 carbon atoms, $y$ is 2 or 3, $a$ is 0 or 1 and $b$ is 1 or 2 with the proviso that $a + b = 2$. Examples of suitable amines include ethanolamine, N-methylethanolamine, N-ethylethanolamine, diethanolamine, propanolamine, isopropanolamine and dipropanolamine. Secondary amines, in particular diethanolamine, are preferred. The amine is reacted with the polyester polyol backbone so as to produce a compound having an acid number of from about 0 to about 27, preferably from about 0 to about 8, a hydroxyl number of from about 12 to about 360, preferably from about 157 to about 185 and an amine number of from about 0.1 to about 6.5, preferably from about 0.1 to about 3, all on a solids basis. Generally, temperatures of from 100° C. to 200° C., preferably 140° C. to 150° C. are used to get the desired amide modified polyester polyol. The amount of amine used in the reaction is determined by the final acid number desired, this amount being readily ascertained by back-calculation.

It should be noted the sequence of reaction steps herein described is necessary to obtain the desired end products. Thus, reaction of the primary or secondary amine at the proper time as above described is effectively a monofunctional reaction which stops the polymer's chain growth; the reaction of the amine earlier in the process would in effect be trifunctional in nature with consequent chain branching and a polyester polyol possessing its own set of unique properties.

The amide modified polyester polyol of this invention is thereafter reacted with an isocyanate to produce a urethane coating having especially good chemical resistance and abrasion resistance. Such coatings are well suited for use as automotive refinish coatings. The amide modified polyester polyol provides one part of a two-package urethane coating system. Typically, the amide modified polyester polyol is dissolved in suitable volatile solvents, e.g., butyl acetate, methyl isopropyl ketone, xylol, and ethylene glycol monoethyl ether acetate to obtain the desired fluidity. At the time of use the amide modified polyester polyol is mixed with the second part of the two-package system, i.e., a suitable isocyanate. Any polyisocyanate or substituted isocyanate is useful herein. Examples thereof include p-phenylene diisocyanate, biphenyl diisocyanate, toluene diisocyanate, 3,3-dimethyl-4,4-diphenyl diisocyanate, 1,4-tetramethylene diisocyanate, hexamethylene diisocyanate, 2,2,4-trimethylhexane-1,6-diisocyanate, methylene bis(phenylisocyanate), lysine diisocyanate, bis-(isocyanoethyl)fumarate, isophorone diisocyanate and methyl-cyclohexyl diisocyanate, isocyanate functional prepolymers, e.g., those formed by the addition of two moles of a diisocyanate to one mole of polycaprolactone diol (available from Union Carbide as PCP-0200), and urethane isocyanates, e.g., NCO-terminated adducts of trimethylol propane/neopentyl glycol/isophorone diisocyanate. The diisocyanates are preferred herein. Typically, the isocyanate is also dissolved in a suitable volatile solvent for fluidity reasons. Examples of suitable solvents include xylene, toluene, ethyl acetate and oxygenated and hydrocarbon solvents free of isocyanate-reactive hydrogens.

Equivalent ratios of the amide modified polyester polyol and isocyanate reactants are often used; however, a hydroxyl equivalent ratio of amide modified polyester polyol to isocyanate of from about 1:1.6 to about 1:1.1 provides satisfactory coatings. One convenient method of obtaining mixing without premature gellation or settling is by spraying the polyester polyol and isocyanate reactants concurrently, but from separate orifices upon a common substrate. It is also feasible to mix the two components and quickly apply the mixture to the substrate.

Optional components generally used in urethane coating systems can be included in either part of the two-package system. Such optional components include pigments, fillers, plasticizers, antioxidants, flow control agents and surfactants.

The aforedescribed coating system can be applied by any conventional method, including spraying, brushing, dipping, flow coating, etc. Suitable substrates include wood, metals, glass, cloth, plastics and foams.

The following examples are illustrative of the invention herein. All acid numbers, hydroxyl numbers and amine numbers are on a solids basis.

EXAMPLE I

The following raw materials are used in this example:

| | |
|---|---|
| Hexahydrophthalic anhydride | 173 grams |
| Adipic acid | 138 grams |
| Neopentyl glycol | 136 grams |
| Trimethylolpropane | 122 grams |
| Diethanolamine | 10 grams |
| n-Butyl acetate | 177 grams |
| Toluene | 44 grams |

A reaction vessel is set up, equipped with heating and agitating means and a fractional distillation column set for distillation. Means for maintaining a nitrogen blanket throughout the reaction is also present.

The hexahydrophthalic anhydride and neopentyl glycol are mixed and heated to 66° C. Thereafter the trimethylolpropane is added. Again, the mixture is heated to 66° C. The adipic acid is next charged to the reaction mixture. The mixture of the four components is heated to 182° C. and held for one-half hour while water is distilled off. The mixture is thereafter heated to 215° C. A sample taken after 7½ hours is identified as a saturated polyester polyol having an acid number of 14.9 and a hydroxyl number of 143. The reacton vessel is now set for azeotropic reflux. The toluene is added carefully to cool the resultant mixture to 150° C. At this point, the diethanol-amine is added. The mixture is allowed to azeotrope at 146° C. until an acid value of less than 5 is obtained. At this point, the n-butyl acetate is added to obtain a fluid mixture.

The solids content of the reaction mixture is 68.9 percent. The resultant amide modified polyester polyol has an acid number of 4.7, a hydroxyl number of 160 and an amine number of 1.6.

EXAMPLE II

A reaction vessel as described in Example I is charged with 8,215 grams of neopentyl glycol, 6,420 grams of adipic acid and 2,495 grams of phthalic anhydride. The mixture is heated to 238° C. under a nitrogen blanket and held for about 4 hours until an acid number of 12.1 is achieved. The heat is removed from the mixture. The mixture is next quenched with 828 grams of ethylbenzene and is sampled. The saturated polyester polyol has a hydroxyl number of 138.

Then 2,850 grams of the aforementioned polyester polyol mixture (95 percent solids) is heated to 150° C. and has 51 grams of diethanolamine charged to it. The resultant mixture is held at 150° C. for about 5 hours until an acid number of less than 7.5 is obtained. At this point, the heat is turned off and the reaction mixture is thinned with 165 grams of ethylbenzene.
The resultant mixture has a solids content of 87.8 percent, an acid number of 7.1, a hydroxyl number of 162 and an amine number of 5.7.

EXAMPLE III

The following raw materials are added to a 12 liter flask equipped as in Example I:

| | |
|---|---|
| Adipic acid | 1,248 grams |
| Isophthalic acid | 2,082 grams |
| 2,2,4-Trimethyl-1,3-pentanediol | 5,016 grams |
| Dibutyltin oxide | 7.6 grams |

The above mixture is heated to 215° C. and held there for about 20 hours until an acid number of 12 is obtained. At this point, the mixture is thinned to 95 percent solids with ethylene glycol monoethyl ether acetate. The resultant polyester polyol has a hydroxyl number of 115.

The aforedescribed polyester polyol (3,489 grams) is heated to 150° C. and has 62 grams of diethanolamine added to it. The resultant mixture is held at 150° C. for about 9 hours until an acid number of 4 is obtained. At this point, the heat is turned off and the mixture is thinned with 150 grams of ethylene glycol monoethyl ether acetate (90 percent solids theoretical, 83.6 percent solids analyzed). The resultant amide modified saturated polyester polyol has an acid number of 8.5, a hydroxyl number of 179 and an amine number of 6.2.

EXAMPLE IV

A five liter flask is equipped with heating means, stirring means and packed column set for distillation. The following raw materials are used:

| | |
|---|---|
| Neopentyl glycol | 782 grams |
| Trimethylolpropane | 701 grams |
| Hexahydrophthalic anhydride | 992 grams |
| Adipic acid | 791 grams |
| Ethanolamine | 34 grams |
| Toluene | 250 grams |
| n-Butyl acetate | 978 grams |

A nitrogen blanket is maintained throughout the reaction. The neopentyl glycol, trimethylolpropane, hexahydrophthalic anhydride and adipic acid are charged to the flask and heated to 232° C. This temperature is maintained until an acid number of 14.8 and a hydroxyl number of 146 are obtained (about 6 hours). At this point, the heat is removed and the reaction mixture quenched with the toluene.

The ethanolamine is added at 114° C. The reactants are allowed to react for the next 3 hours at 150° C. The mixture is then thinned with the n-Butyl acetate and sampled. The sampled product is identified as an amide modified saturated polyester polyol having an acid number of 4.5, hydroxyl number of 164 and an amine number of 2.5.

EXAMPLE V

The amide modified polyester polyol of Example I is blended with an isocyanate-containing component to give a urethane coating composition as follows:

| | Percent |
|---|---|
| Amide modified polyester polyol of Example 1 (69 percent solids) | 30 |
| Titanium dioxide | 25 |

The above coating composition is made from a two-package urethane system. One package is made by grinding the titanium dioxide pigment into the amide modified polyester polyol at a ratio of 6:1 on a solids basis. Thereafter, the additional amide modified polyester polyol and the triethylenediamine are added to form one package of the two-package urethane system. The resultant pigmented composition is storage stable with the titanium dioxide pigment well dispersed. At the time of coating, the pigmented composition is let down with a solvent blend of 30 percent acetone, 20 percent mineral spirits and 50 percent ethylene glycol monoethyl ether acetate and blended with the second package of the system, i.e., the Spenlite P25-60CX to give a sprayable composition of 35 percent solids. The potlife of the composition is about 8 hours.

When primed steel or aluminum is coated with the coating composition, the resultant product possesses excellent chemical and abrasion resistance and has high gloss. The improved properties are believed to be primarily due to the excellent stable dispersion of the pigment in the composition obtained from use of the amide modified polyester polyol described herein.

According to the provisions of the Patent Statutes, there are described above the invention and what are now considered to be its best embodiments. However, within the scope of the appended claims, it is to be understood that the invention can be practiced otherwise than as specifically described.

What is claimed is:

1. An amide modified saturated polyester polyol wherein the polester polyol backbone is prepared from a polyhydric alcohol having from 2 to 15 carbon atoms and a polybasic carboxylic acid having from 4 to 14 carbon atoms, said polyester polyol backbone having an acid number of from about 3 to about 30 and a hydroxyl number of from about 10 to about 300, said polyester polyol backbone being modified with a primary or secondary amine of formula $N(H)(R)_a(C_yH_{2y}OH)_b$ where R is hydrogen or an alkyl group containing from 1 to 4 carbon atoms, $y$ is 2 or 3, $a$ is 0 or 1 and $b$ is 1 or 2 with the proviso that $a + b = 2$, said amide modified polyester polyol having an acid number of from about 0 to about 27, a hyrdoxyl number of from about 12 to about 360 and an amine number of from about 0.1 to about 6.5.

2. The amide modified saturated polyester polyol of claim 1 wherein the polyhydric alcohol is a diol, a triol or a mixture thereof.

3. The amide modified saturated polyester polyol of claim 2 wherein the polybasic carboxylic acid is an aliphatic dicarboxylic acid having from 4 to 14 carbon atoms, an alicyclic or aromatic dicarboxylic acid having from 8 to 14 carbon atoms or mixtures thereof.

4. The amide modified saturated polyester polyol of claim 3 wherein the polybasic carboxylic acid is selected from the group consisting of phthalic acid, phthalic anhydride, isophthalic acid, terephthalic acid, hexahydrophthalic anhydride, succinic acid, succinic anhydride, glutaric acid, adipic acid, azelaic acid, sebacic acid and mixtures thereof.

5. The amide modified saturated polyester polyol of claim 4 wherein the polyhydric alcohol is selected from the group consisting of ethylene glycol, propylene glycol, butylene glycol, diethylene glycol, dipropylene glycol, triethylene glycol, neopentyl glycol, neopentyl glycol hydroxypivalate, 2,2,4-trimethyl-1,3-pentanediol, cyclohexanedimethanol, trimethylene glycol, trimethylolpropane, trimethylolethane, glycerol, 1,2,6-hexanetriol, pentaerythritol, sorbitol, manitol and mixtures thereof.

6. The amide modified saturated polyester polyol of claim 5 wherein the polyester polyol backbone is modified with a secondary amine.

7. The amide modified saturated polyester polyol of claim 6 wherein the polybasic carboxylic acid is a mixture of hexahydrophthalic anhydride and adipic acid and the polyhydric alcohol is a mixture of neopentyl glycol and trimethylolpropane.

8. The amide modified saturated polyester polyol of claim 7 wherein the secondary amine is diethanolamine.

9. The amide modified saturated polyester polyol of claim 5 wherein the polyester polyol backbone has an acid number of from about 10 to about 16 and a hydroxyl number of from about 130 to about 145.

10. The amide modified saturated polyester polyol of claim 9 having an acid number of from about 0 to about 8, a hydroxyl number of from about 157 to about 185, and an amine number of from about 0.1 to about 3.

11. An amide modified saturated polyester polyol wherein the polyester polyol backbone is prepared from (1) a polyhydric alcohol mixture of a diol and a triol having from 2 to 15 carbon atoms with at least 50 mole percent of the mixture being the diol and (2) a polybasic carboxylic acid of an aliphatic dicarboxylic acid having from 4 to 14 carbon atoms, an alicyclic or aromatic dicarboxylic acid having from 8 to 14 carbon atoms or mixtures thereof, said polyester polyol having an acid number of from about 3 to about 30 and a hydroxyl number of from about 10 to about 300, said polyester polyol backbone being modified with a secondary amine of formula $NH(C_yH_{2y}OH)_2$ where $y$ is 2 or 3, said amide modified polyester polyol having an acid number of from about 0 to about 27, a hydroxyl number of from about 12 to about 360 and an amine number of from about 0.1 to about 6.5.

12. The amide modified saturated polyester polyol of claim 11 wherein the polyhydric alcohol mixture is a mixture of neopentyl glycol and trimethylolpropane in a mole ratio of about 1.4:1 to about 1.5:1, the polybasic carboxylic acid is a mixture of hexahydrophthalic anhydride and adipic acid in a mole ratio of about 1:0.8 to about 1:0.9 and the secondary amine is diethanolamine.

13. A process of making an amide modified saturated polyester polyol comprising the steps of:
(a) preparing a saturated polyester polyol from a polyhydric alcohol having from 2 to 15 carbon atoms and a polybasic carboxylic acid having from 4 to 14 carbon atoms so as to produce a polyester polyol having an acid number of from about 3 to about 30 and a hydroxyl number of from about 10 to about 300; and
(b) reacting the polyester polyol of step (a) with a primary or secondary amine of formula $N(H)(R)_a(C_yH_{2y}OH)_b$ wherein R is hydrogen or an alkyl group containing from 1 to 4 carbon atoms, $y$ is 2 or 3, $a$ is 0 or 1 and $b$ is 1 or 2 with the proviso that $a + b = 2$ so as to produce the amide modified polyester polyol compound having an acid number of from about 0 to about 27, a hydroxyl number of from about 12 to about 360 and an amine number of from about 0.1 to about 6.5.

14. The process of claim 13 wherein the polybasic carboxylic acid is an aliphatic dicarboxylic acid having from 4 to 14 carbon atoms, an alicyclic or aromatic dicarboxylic acid having from 8 to 14 carbon atoms or mixtures thereof.

15. The process of claim 14 wherein the polyhydric alcohol is a diol, a triol or a mixture thereof.

16. The process of claim 15 wherein the polybasic carboxylic acid is selected from the group consisting of phthalic acid, phthalic anhydride, isophthalic acid, terephthalic acid, hexahydrophthalic anhydride, succinic acid, succinic anhydride, glutaric acid, adipic acid, azelaic acid, sebacic acid and mixtures thereof.

17. The process of claim 16 wherein the polyhydric alcohol is selected from the group consisting of ethylene glycol, propylene glycol, butylene glycol, diethylene glycol, dipropylene glycol, triethylene glycol, neopentyl glycol, neopentyl glycol hydroxypivalate, 2,2,4-trimethyl-1,3-pentanediol, cyclohexanedimethanol, trimethylene glycol, trimethylolpropane, trimethylolethane, glycerol, 1,2,6-hexanetriol, pentaerythritol, sorbitol, manitol and mixtures thereof.

18. The process of claim 17 wherein the polybasic carboxylic acid is a mixture of hexahydrophthalic anhydride and adipic acid and the polyhydric alcohol is a mixture of neopentyl glycol and trimethylolpropane.

19. The process of claim 18 wherein the amine is a secondary amine.

20. The process of claim 19 wherein the amine is diethanolamine.

* * * * *